(12) United States Patent
Tammaro

(10) Patent No.: US 6,218,775 B1
(45) Date of Patent: Apr. 17, 2001

(54) CATHODE RAY TUBE NECK GLASS

(75) Inventor: David A. Tammaro, Painted Post, NY (US)

(73) Assignee: Corning Incorporated, Corning, NY (US)

(*) Notice: Subject to any disclaimer, the term of this patent is extended or adjusted under 35 U.S.C. 154(b) by 0 days.

(21) Appl. No.: 09/292,058

(22) Filed: Apr. 14, 1999

Related U.S. Application Data

(60) Provisional application No. 60/093,513, filed on Jul. 21, 1998.

(51) Int. Cl.[7] .............................. C03C 3/105; H01J 29/86
(52) U.S. Cl. ................................ 313/480; 501/60; 501/62
(58) Field of Search ..................... 313/480, 477 R; 501/60, 62, 69

(56) References Cited

U.S. PATENT DOCUMENTS 5,192,718  3/1993  Danielson ........................... 501/60

*Primary Examiner*—Michael H. Day
(74) *Attorney, Agent, or Firm*—Milton M Peterson

(57) ABSTRACT

A cathode ray tube with an improved tubular glass neck member having a softening point in the range of 640–650° C., an annealing temperature in the range of 460–472° C., a strain point in the range of 420–425° C., a coefficient of thermal expansion in the range of $94$–$97 \times 10^{-7}$/° C., and a linear x-ray absorption value of at least 100 $cm^{-1}$ and a composition, as calculated in weight % on an oxide basis, consisting essentially of 46.5–49.5% $SiO_2$, 1.5–2% $Al_2O_3$, 0.5–1.5% $Na_2O$, 10–12% $K_2O$, 2–3% SrO, 1–1.8% BaO, 32–34% PbO, 1–1.5% ZnO and a fining agent.

9 Claims, 1 Drawing Sheet

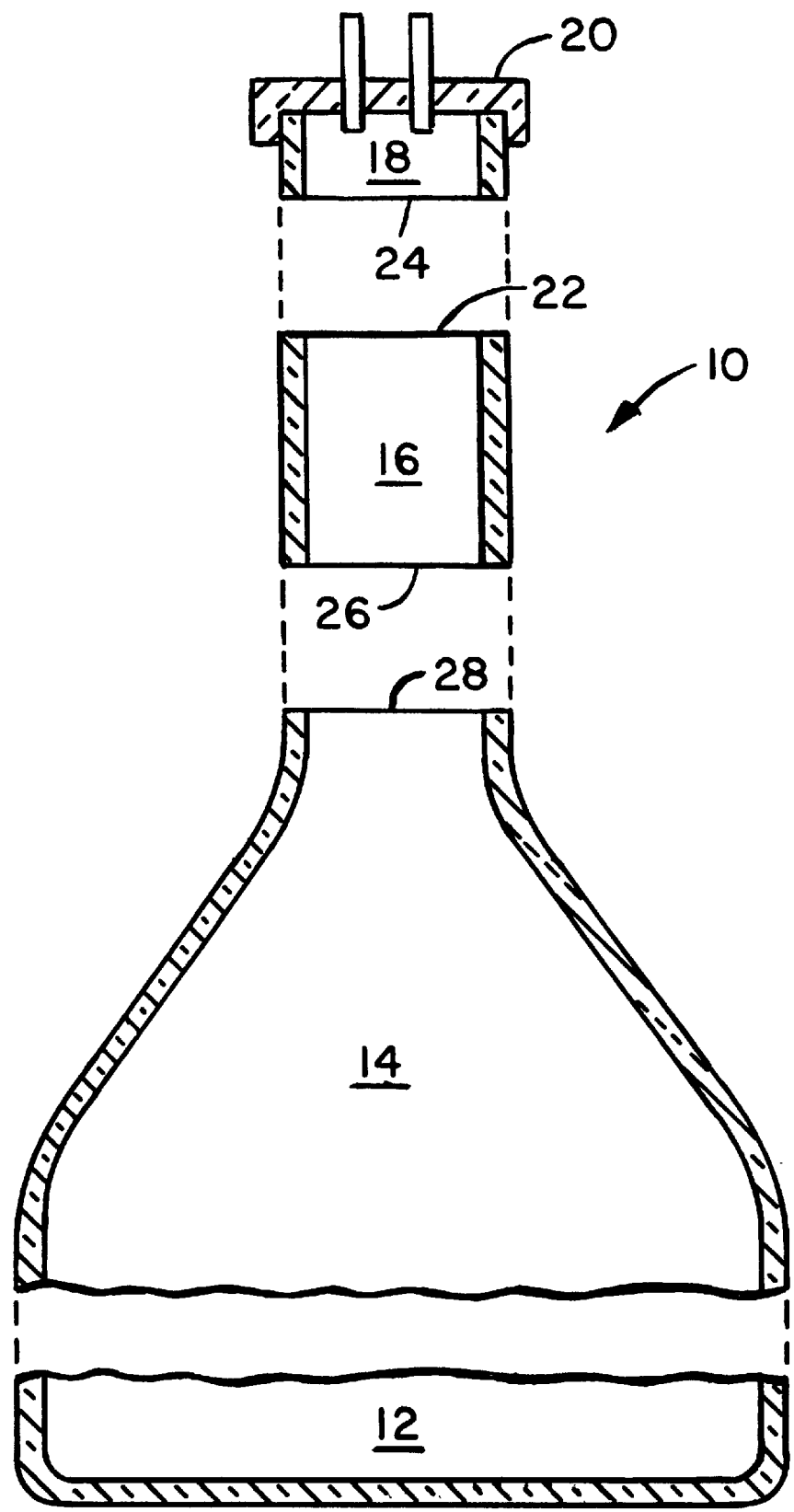

CATHODE RAY TUBE NECK GLASS

This application claims the benefit of U.S. Provisional Application, Ser. No. 60/093,513, filed Jul. 21, 1998 entitled CATHODE RAY TUBE NECK GLASS, by David A. Tammaro.

FIELD OF THE INVENTION

Cathode ray tubes and, more particularly, a neck glass that is compatible with other glass components of a tube envelope.

BACKGROUND OF THE INVENTION

The envelope for a conventional cathode ray tube is composed of a faceplate, a funnel, a neck and an electron gun mount. These several components are commonly formed separately and hermetically sealed together to form a completed tube envelope. Other tube components, such as a mask and a phosphor screen, are assembled within the envelope to form a functional tube after the envelope is evacuated and sealed.

The neck portion of a cathode ray tube is customarily drawn from a glass melt as tubing. It is conventional practice to draw such tubing by a Vello or a downdraw process. The tubing is drawn continuously from the forehearth and bowl of a continuous, glass tank. Such a process is depicted and described, for example, in U.S. Pat. Nos. 2,009,326 and 2,009,793 (Vello) and at pages 210–211 of the glass text, *Glass: The Miracle Maker*, C. J. Phillips, Pitman Publishing Corporation (1941).

A continuous length of glass tubing, thus drawn, is cooled and cut into short lengths to form neck members for cathode ray tube envelopes. U.S. Pat. No. 5,192,718 (Danielson) describes a family of lead silicate glasses particularly well adapted to drawing neck glass tubing for use in cathode ray tube envelopes. The Danielson glasses were designed to provide a low liquidus value. This avoided a troublesome, devitrification problem that developed in the forehearth/bowl outlet as tubing was drawn through the outlet.

A glass, based on Example 12 of the Danielson patent, was developed for production of neck glass tubing. This glass provided generally satisfactory sealing results in cathode ray tube production. However, the glass was recognized as being a relatively hard glass. This meant that the glass had a relatively high temperature-viscosity curve. For sealing purposes, good results were obtained with a burner having a strong, hot flame. However, variations in burners, and consequent variations in flame temperatures, could result in poor seals. This created the possibility of cracks developing in the seal.

It became desirable, then, to provide a neck glass that would be universally acceptable. Such glass would be able to accommodate to different sealing processes without risk of cracks developing in the seal. At the same time, other requisite properties of the current, commercial glass would have to be maintained, or preferably improved upon.

The basic purpose of the present invention is to provide an improved, tubular, neck glass.

A further purpose is to provide an improved, tubular, neck component for sealing in a cathode ray tube.

Another purpose is to provide a tubular, neck component that can be compatibly sealed between a funnel member and an electron gun mount to produce a cathode ray tube envelope.

A still further purpose is to provide a tubular, neck glass that can accommodate to different, flame sealing processes and burners while avoiding cracks in the seals produced.

These purposes, and others, are achieved through practice of the invention hereafter disclosed and claimed.

SUMMARY OF THE INVENTION

The invention resides in part in a cathode ray tube comprising a glass funnel member, a glass gun mount, and an improved tubular, glass, neck member sealed to, and connecting the gun mount and the funnel member, the improved tubular neck member having a softening point in the range of 640–650° C., an annealing temperature in the range of 460–472° C., a strain point in the range of 420–425° C., a coefficient of thermal expansion in the range of 94–97×10$^{-7}$/° C., and a linear X-ray absorption value of at least 100 cm$^{-1}$ and a composition, as calculated in weight % on an oxide basis, consisting essentially of 46.5–49.5% $SiO_2$, 1.5–2% $Al_2O_3$, 0.5–1.5% $Na_2O$, 10–12% $K_2O$, 2–3% SrO, 1–1.8% BaO, 32–34% PbO, 1–1.5% ZnO and a fining agent.

The invention further resides in a length of glass tubing drawn from a lead silicate glass melt, the glass having a softening point in the range of 640–650° C., an annealing temperature in the range of 460–472° C., a strain point in the range of 420–425° C., a coefficient of thermal expansion in the range of 94–97×10$^{-7}$/° C., and a linear X-ray absorption value of at least 100 cm$^{-1}$ and a composition, as calculated in weight % on an oxide basis, consisting essentially of 46.5–49.5% $SiO_2$, 1.5–2% $Al_2O_3$, 0.5–1.5% $Na_2O$, 10–12% $K_2O$, 2–3% SrO, 1–1.8% BaO, 32–34% PbO, 1–1.5% ZnO and a fining agent.

Another aspect of the invention is a family of lead silicate glasses having a softening point in the range of 640–650° C., an annealing temperature in the range of 460–472° C., a strain point in the range of 420–425° C., a coefficient of thermal expansion in the range of 94–97×10$^{-7}$/° C., and a linear X-ray absorption value of at least 100 cm$^{-1}$ and a composition, as calculated in weight % on an oxide basis, consisting essentially of 46.5–49.5% $SiO_2$, 1.5–2% $Al_2O_3$, 0.5–1.5% $Na_2O$, 10–12% $K_2O$, 2–3% SrO, 1–1.8% BaO, 32–34% PbO, 1–1.5% ZnO and a fining agent.

BRIEF DESCRIPTION OF THE INVENTION

The Single FIGURE in the accompanying drawing is an exploded view showing the basic members of a typical cathode ray tube generally designated by the numeral 10, Cathode ray tube 10 includes, as basic component members, a skirted, panel member 12, a conical, funnel member 14, a tubular, neck member 16, and a ring member 18 upon which an electron gun 20 (shown schematically) is mounted. In assembling these components into a tube, one end 22 of neck member 16 will be flame sealed to end 24 on glass ring 18. Glass ring 18 may be formed from a lead silicate glass available from Corning Incorporated under the designation Code 0120. This glass consists essentially of, as calculated in weight % on an oxide basis about 57% $SiO_2$, 30% PbO, 4% $Na_2O$, 8% $K_2O$ and 1% $Al_2O_3$.

The opposite end 26 of neck member 16 is sealed to the small diameter end 28 of funnel member 14. Funnel member 14 may be formed from a variety of glasses known in the art. One such glass is available from Corning Incorporated under Code 0138. It consists essentially of, as calculated in weight % on an oxide basis, 50.3% $SiO_2$, 4.7% $Al_2O_3$, 22.5% PbO, 4.3% CaO, 2.9% MgO, 6.1% $Na_2O$, 8.5% $K_2O$, and 0.1–0.2% of F, SrO, BaO and a fining agent.

The present invention is concerned with improved glasses for production of neck member 16. Therefore, it is described with respect to such glasses and their properties.

Experience indicated that the commercial glass based on the Danielson patent might not accommodate to all sealing processes. This led to a search for a neck glass that would be more flexible, that is, could accommodate to variations in the sealing cycle and temperatures. It was recognized that the several electrical properties, radiation absorbing characteristics, and glass physical properties would have to be maintained, if not enhanced. These properties included an electrical resistivity greater than 8.0 ohm-cm (Log R at 350° C.), a linear X-ray absorption of at least 95 cm$^{-1}$ at a wavelength of 0.6 Å, and a resistance to devitrification during tube drawing from a melt.

It was also highly desirable to remain as close to the present glass as possible in terms of glass components. This would facilitate changeover, as well as avoid learning to melt a new glass. Accordingly, initial efforts were directed at modifying the present glass. The two areas showing most promise were the coefficient of thermal expansion (CTE) and the viscosity-temperature curve. The latter is indicative of the glass hardness.

Initial efforts were directed at decreasing the temperature level of the entire viscosity-temperature curve of the present glass while not disturbing other properties. A target was a drop of about 10° C. This was considered sufficient to enable using a sealing flame not as hot as required for the present glass.

One proposal was to substitute one or two percent of $Na_2O$ for $K_2O$ and a like substitution of PbO for the alkaline earth metal oxides BaO and SrO. At the same time, other constituents, such as $SiO_2$ and $Al_2O_3$ received minor adjustment. These substitutions increased the temperature in the melting region too much, and decreased the curve too much otherwise.

Next, the parent glass was modified by substituting PbO for $K_2O$ and $SiO_2$. This produced curves not substantially different from the present glass. These results led to exploring intermediate mixtures to see if the target could be approached more closely.

The results obtained with these mixtures have led to a small family of glasses that achieve the target of a lower, viscosity-temperature curve. The narrow composition ranges for this glass family are as follows, in weight percent on an oxide basis:

| | |
|---|---|
| $SiO_2$ | 46.5–49.5 |
| $Al_2O_3$ | 1.5–2.0 |
| $Na_2O$ | 0.5–1.5 |
| $K_2O$ | 10–12 |
| SrO | 2.0–3.0 |
| BaO | 1.0–1.8 |
| PbO | 32–34 |
| ZnO | 1–1.5 |
| $Sb_2O_3$ | 0.3–1.0 |

These glasses possess significant properties as follows:

| | |
|---|---|
| Softening Point | 640–650° C. |
| Annealing Point | 460–472° C. |
| Strain Point | 420–430° C. |
| CTE | 94–97 × 10$^{-7}$/° C. |
| Calc Mμ at 0.6 Å | >100 |
| Elec. Res. (ohm cm./350° C.) | >8.25 |

They represent a selection of glasses not specifically disclosed in the Danielson patent and exhibiting properties superior to the glasses there disclosed.

Optimum properties are obtained with glasses having components within the following, somewhat narrower ranges in weight percent:

| | |
|---|---|
| $SiO_2$ | 46.5–48.5 |
| $Al_2O_3$ | 1.5–2.0 |
| $Na_2O$ | 0.75–1.5 |
| $K_2O$ | 10.5–11.5 |
| SrO | 2.0–3.0 |
| BaO | 1.0–1.5 |
| PbO | 32–34 |
| ZnO | 1–1.5 |
| $Sb_2O_3$ | 0.3–1.0 |

TABLE I sets forth exemplary compositions of the present invention, together with Example 8 of the Danielson patent for comparison. The compositions are analyzed values presented in weight % on an oxide basis. Also presented are properties measured on test pieces of each glass.

TABLE I

| oxides | 1 | 2 | 3 | 4 | 5 | Ex. 8 |
|---|---|---|---|---|---|---|
| $SiO_2$ | 48.1 | 47.7 | 47.2 | 48.2 | 47.0 | 48.4 |
| $Al_2O_3$ | 1.8 | 1.7 | 1.7 | 1.7 | 1.6 | 1.7 |
| $Na_2O$ | 1.2 | 1.0 | 1.3 | 1.0 | 1.1 | 1.0 |
| $K_2O$ | 10.9 | 10.9 | 10.7 | 11.1 | 10.9 | 12.3 |
| SrO | 2.2 | 2.5 | 2.2 | 2.5 | 2.5 | 3.0 |
| BaO | 1.1 | 1.4 | 1.1 | 1.4 | 1.4 | 1.8 |
| PbO | 32.9 | 33.3 | 33.5 | 32.4 | 33.2 | 30.3 |
| ZnO | 1.3 | 1.0 | 1.2 | 1.2 | 1.2 | 1.0 |
| $Sb_2O_3$ | 0.5 | 0.5 | 0.9 | 0.5 | 0.5 | 0.5 |
| Properties | | | | | | |
| Soft. Pt. | 648 | 650 | 643 | 646 | 645 | 658 |
| Ann. Pt. | 467 | 471 | 463 | 467 | 464 | 471 |
| Strain Pt. | 424 | 428 | 421 | 425 | 423 | 432 |
| CTE | 94.7 | 96.2 | 95.2 | 95.8 | 95.2 | 98.3 |
| Mμ @ 0.6 Å | 103.6 | 105.6 | 105.7 | 102.9 | 105 | — |
| Elec. Res. | 8.36 | 8.4 | 8.4 | 8.4 | — | 8.3 |

A 3 kg. (about 6 lbs.) glass melt of each composition was produced by melting turbular-mixed batches of production-type, raw materials. The batches were melted for four hours at 1550° C. in platinum crucibles in a gas-oxygen furnace. The melts were made in covered crucibles, and were poured in slab molds 15×30×1.25 cm. (6×2×0.5") to provide test pieces for measurements. The slabs were annealed at 490° C.

Physical properties (softening, annealing and strain points; and 10 coefficients of thermal expansion) were determined by customary, ASTM methods. X-ray absorption coefficients were calculated for 0.6 Angstrom unit radiation using measured densities and well known compositional factors. Electrical resistivity and expansion mismatch measurements were made in conventional manner.

Normally, minor changes in composition produce little change in either mechanical strength or electrical resistivity. It was surprising, then, to find that the present glasses exhibited significantly higher values than glass currently in use.

Flexural strength was determined employing a four-point flexure apparatus with 300 and 100 mm. load spans and a 19.2 mm. diameter steel pin loading. It was also determined using a three-point flexure apparatus with a 50 mm. support span and a 24.1 mm diameter, steel pin loading. The glass of Example 5 in TABLE I was compared to two commercial tube glasses using both measuring apparati. The mean values from nine measurements on each glass, by each apparatus, are presented in TABLE II with mechanical strength values being in psi units.

TABLE II

| span | GLASS | | |
|---|---|---|---|
| | 5 | X | Y |
| 50 mm | 6219 | 5709 | 5813 |
| 300 mm | 7396 | 6821 | 7462 |

Dielectric strength measurements were made at room temperature employing ⅙ cm. (¹⁄₁₆") stainless steel electrodes. Ten samples of each glass, generally in the range of 0.25–0.28 nm (10–11 mils) thickness, were tested. The mean average value for Glass 5 was 5718 volts/mil, for commercial X glass was 4474 volts/mil, and for glass Y was 4712 volts/mil.

The properties of the gun mount glass, Code 0120, and the funnel glass, Code 0138, are such that a mismatch to the neck glass is to be expected. It is desirable to minimize this as much as possible, and to divide it relatively equally between the two seals. It has been found possible to essentially accomplish this with Glass 5. A mismatch of 98 ppm occurs between Glass 5 and Code 0120, and mismatch of 94 ppm occurs between Glass 5 and Code 0138. Accordingly, Glass 5 is regarded as the best mode.

What is claimed is:

1. In a cathode ray tube comprising a glass, funnel member, a glass, gun mount, and a tubular, neck glass member sealed to, and connecting, the gun mount and the funnel member, an improved, tubular, neck member having a softening point in the range of 640–650° C., an annealing temperature in the range of 460–472° C., a strain point in the range of 420–425° C., a coefficient of thermal expansion in the range of 94–97×10$^{-7}$/° C., and a linear x-ray absorption value of at least 100 cm$^{-1}$ and a composition, as calculated in weight % on an oxide basis, consisting essentially of 46.5–49.5% $SiO_2$, 1.5–2% $Al_2O_3$, 0.5–1.5% $Na_2O$, 10–12% $K_2O$, 2–3% SrO, 1–1.8% BaO, 32–34% PbO, 1–1.5% ZnO and a fining agent.

2. A cathode ray tube in accordance with claim 1 wherein the tubular, neck member has a composition consisting essentially of 46.5–48.5% $SiO_2$, 1.5–2.0% $Al_2O_3$, 0.75–1.5% $Na_2O$, 10.5–11.5% $K_2O$, 2.0–3.0% SrO, 1.0–1.5% BaO, 32–34% PbO, 1–1.5% ZnO and 0.3–1.0% $Sb_2O_3$.

3. A cathode ray tube in accordance with claim 1 wherein the tubular neck member has a softening point of 645° C., an annealing temperature of 464° C., a strain point of 423° C., a coefficient of thermal expansion of 95.2×10$^{-7}$/° C., a linear x-ray absorption value of 105 cm$^{-1}$ and a composition consisting of, in weight percent on an oxide basis, 47.3% $SiO_2$, 1.6% $Al_2O_3$, 1.1 $Na_2O$, 10.9% $K_2O$, 2.5% SrO, 1.4% BaO, 33.4% PbO, 1.2% ZnO and 0.6% $Sb_2O_3$.

4. A length of glass tubing drawn from a lead silicate glass melt, the glass having a softening point in the range of 640–650° C., an annealing temperature in the range of 460–472° C., a strain point in the range of 420–425° C., a coefficient of thermal expansion in the range of 94–97×10$^{-7}$/° C., and a linear x-ray absorption value of at least 100 cm$^{-1}$ and a composition, as calculated in weight oxide basis, consisting essentially of 46.5–49.5% $SiO_2$, 1.5–2% $Al_2O_3$, 0.5–1.5% $Na_2O$, 10–12% $K_2O$, 2–3% SrO, 1–1.8% BaO, 32–34% PbO, 1–1.5% ZnO and a fining agent.

5. A length of glass tubing in accordance with claim 4 wherein the glass has a composition consisting essentially of 46.5–48.5% $SiO_2$, 1.5–2.0% $Al_2O_3$, 0.75–1.5% $Na_2O$, 10.5–11.5% $K_2O$, 2.0–3.0% SrO, 1.0–1.5% BaO, 32–34% PbO, 1–1.5% ZnO and 0.3–1.0% $Sb_2O_3$.

6. A length of glass tubing in accordance with claim 4 wherein the glass has a softening point of 645° C., an annealing temperature of 464° C., a strain point of 423° C., a coefficient of thermal expansion of 95.2×10$^{-7}$/° C., a linear x-ray absorption value of 105 cm$^{-1}$ and a composition consisting of, in weight percent on an oxide basis, 47.3% $SiO_2$, 1.6% $Al_2O_3$, 1.1 $Na_2O$, 10.9% $K_2O$, 2.5% SrO, 1.4% BaO, 33.4% PbO, 1.2% ZnO and 0.6% $Sb_2O_3$.

7. A family of lead silicate glasses having a softening point in the range of 640–650° C., an annealing temperature in the range of 460–472° C., a strain point in the range of 420–425° C., a coefficient of thermal expansion in the range of 94–97×10$^{-7}$/° C., and a linear x-ray absorption value of at least 100 cm$^{-1}$ and a composition, as calculated in weight % on an oxide basis, consisting essentially of 46.5–49.5% $SiO_2$, 1.5–2% $Al_2O_3$, 0.5–1.5% $Na_2O$, 10–12% $K_2O$ 2–3% SrO, 1–1.8% BaO, 32–34% PbO, 1–1.5% ZnO and a fining agent.

8. A lead silicate glass in accordance with claim 7 wherein the glass has a composition consisting essentially of 46.5–48.5% $SiO_2$, 1.5–2.0% $Al_2O_3$, 0.75–1.5% $Na_2O$, 10.5–11.5% $K_2O$, 2.0–3.0% SrO, 1.0–1.5% BaO, 32–34% PbO, 1–1.5% ZnO and 0.3–1.0% $Sb_2O_3$.

9. A lead silicate glass in accordance with claim 7 wherein the glass has a softening point of 645° C., an annealing temperature of 464° C., a strain point of 423° C., a coefficient of thermal expansion of 95.2×10$^{-7}$/° C., a linear x-ray absorption value of 105 cm$^{-1}$ and a composition consisting of, in weight percent on an oxide basis, 47.3% $SiO_2$, 1.6% $Al_2O_3$, 1.1 $Na_2O$, 10.9% $K_2O$, 2.5% SrO, 1.4% BaO, 33.4% PbO, 1.2% ZnO and 0.6% $Sb_2O_3$.

\* \* \* \* \*